358-86. XR 3,581,209 SR

[redacted] [redacted] [redacted]

[11] 3,581,209

[72] Inventors Arie Zimmerman
Los Angeles, Calif. 90005;
James A. Kuksch, 46256;
Gerald D. Smith, both of
Indianapolis, Ind. 46220

[21] Appl. No. 760,158
[22] Filed Sept. 17, 1968
[45] Patented May 25, 1971
[73] Assignee Assignors to Anaconda Wire and Cable Company, a Corporation of Delaware and Versatek Industries, Inc., Indianapolis, Ind.

[54] CABLE TELEVISION PROGRAM CAPACITY ENHANCEMENT
18 Claims, 4 Drawing Figs.

[52] U.S. Cl. .......... 325/308, 178/6
[51] Int. Cl. .......... H04h 1/04, H04n 7/10
[50] Field of Search .......... 178/6 (PD); 325/308; 178/6, 6.8

[56] References Cited
UNITED STATES PATENTS
2,854,506 9/1958 Pickles .......... 178/6

*Primary Examiner*—Robert L. Richardson
*Attorney*—White and Haefliger

ABSTRACT: The invention concerns a system wherein a distribution cable is operable to transmit TV signals to TV receivers each having a limited number of local channels, the method of the invention enabling selective reception on said channels of cable distributed programs the number of which exceeds the number of said local channels, the method including, processing said signals to derive at least two groups of resultant signals characterized in that the resultant signals of each group have carrier frequencies corresponding to those characteristic of said local channels, and selectively and individually connecting said resultant groups of signals with the input to a TV receiver.

TX 500.

PATENTED MAY 25 1971

3,581,209

INVENTORS.
ARIE ZIMMERMAN
JAMES A. LUKSCH
GERALD D. SMITH
By
White & Haefliger
ATTORNEYS.

CABLE TELEVISION PROGRAM CAPACITY ENHANCEMENT

BACKGROUND OF THE INVENTION

This invention relates generally to cable television, and more particularly concerns method and apparatus characterized as increasing the program receiving and presenting capacity of a standard VHF television receiver.

In cable television systems it is common to transmit a number of programs on the distribution cable for selective reception at subscriber receivers tapped into the cable. Those signals may, for example, be picked up by a single antenna from the broadcasting of several television stations which the subscribers may not be able to receive; processed; amplified; and transmitted on the cable. At the present time the number of such programs that can be usefully transmitted on the cable at VHF frequencies is limited to the number of available channels at the receiver, i.e. channels 2—13. This presents a severe programming restriction, since it is possible to transmit many more than 12 VHF programs on distribution cable. For example, 21 channels or programs could be transmitted in using the entire band 132—258 mc., 6 mc. being assigned to each channel. In actuality, receiver channels 2—6 occupy the 54—88 mc. band, and receiver channels 7—13 occupy the 174—216 mc. band.

BRIEF SUMMARY OF THE INVENTION

It is a major object of the invention to obviate the programming restriction problem referred to above through the provision of means for selectively transmitting a large number of cable transmitted programs over a limited number of local receiver channels and enabling very simple program selection by the viewer. Basically, the method of the invention involves the steps of processing the transmitted program signals to derive at least two groups of resultant signals characterized in that the resultant signals of each group have carrier frequencies corresponding to those characteristic of the local channels; and selectively and individually connecting the resultant groups of signals with the inputs to one or more TV receivers. As will be seen, the processing step may be carried out proximate each receiver, or, more economically may be carried out remotely from the receivers as for example at the distribution cable tap. In the latter event, the resultant groups of signals as referred to may be transmitted to each receiver, proximate which the step of selectively and individually connecting (i.e. switching) the groups of signals with the receiver input may be effected most economically and conveniently.

As will appear, the processing step may typically include filtering the cable transmitted signals to transmit them on multiple parallel paths (i.e. one path for each group). Further, certain of the signals on at least one of the paths has carrier frequencies out of correspondence to those characteristic of the local channels, and the processing includes converting the frequencies of such certain signals to the resultant signals of a group associated with that one path. Such converting may typically include providing a fixed oscillatory signal, or signals, and heterodyning it with those certain signals.

In its apparatus aspects the invention includes processing means to derive the resultant signals as referred to, together with selector means for selectively and individually connecting the resultant groups of signals with the input to a TV receiver. The processing means may be located proximate to or remotely from a receiver, as referred to above, and may include band pass filter means as well as converter means having a modulator or mixer to which the fixed oscillatory signal is supplied.

These and other objects and advantages of the invention, as well as the details of an illustrative embodiment, will be more fully understood from the following detailed description of the drawings, in which: BRIEF DESCRIPTION OF THE DRAWING FIG. 1 is a block diagram of a cable television distribution system;

Figures 1, 2, 3, 4:
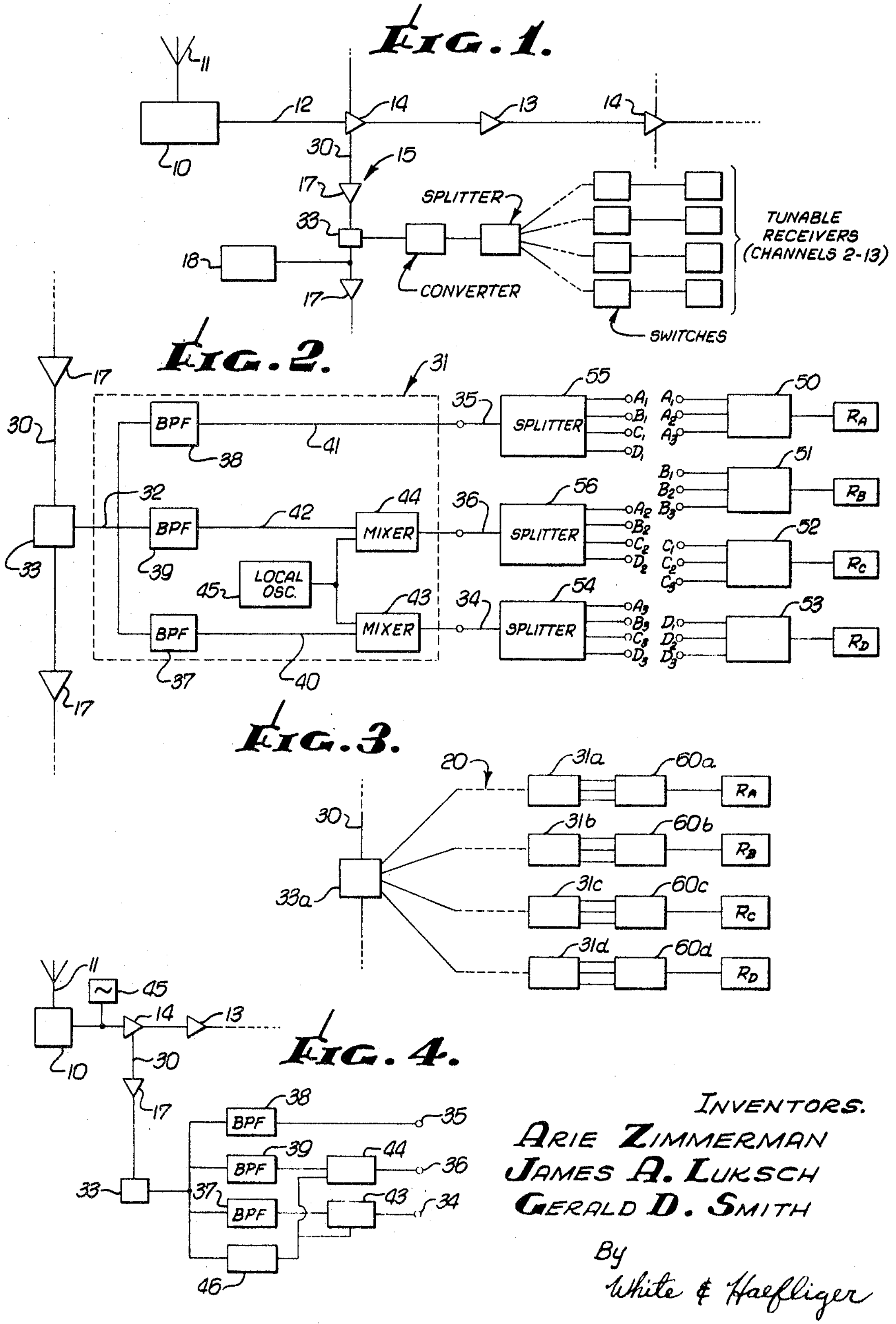
FIG. 2 is a block diagram illustrating one form of the invention.
FIG. 3 is a block diagram showing another form of the invention.

FIG. 4 is a portion of a block diagram showing a modified form of the invention. DESCRIPTION OF PREFERRED EMBODIMENTS Referring first to FIG. 1, the illustrated cable television system includes head end equipment 10 with antenna 11 to pick up broadcast multichannel television signals, as may originate in a number of different areas or cities. Such equipment is known and is operable to correct and adjust the signal levels for both picture and sound carriers, and also change frequencies.

To the right of equipment 10 is shown a main trunk line, which may consist of coaxial cable 12 with repeater or main trunk amplifiers 13 connected in series with and spaced along the cable. AGC amplifiers may also be connected in series with the cables to provide automatic correction for changes in signal level. The main trunk line also includes bridging amplifiers 14, each having several outputs and enough gain to make up for isolation loss and power loss inherent in multiple outputs. From amplifiers 14 feeder lines 15 are run along a row of subscriber's houses, such lines including cable 30 and extender amplifiers 17 to compensate for line loss. Power to the cable is supplied as by sources 18, and directional taps or couplers 33 are provided, these being known devices. A tap **33*a* shown in FIG. 3 has multiple outputs 20** to which individual home receivers $R_A$—$R_D$ are electrically connected.

In accordance with the invention, apparatus is provided to enable selective reception on TV receiver channels (as for example VHF channels 2—13) of cable distributed programs the number of which exceeds the number of such local channels. Such apparatus include means for processing the cable supplied signals to derive at least two groups of resultant signals characterized in that the resultant signals of each group have carrier frequencies corresponding to those characteristic of the local channels.

Merely as illustrative, 21 programs may be distributed on cable 30 in FIG. 2, in the 132—258 mc. band. Processing means is shown generally at 31 as being operable to receive the 21 programs at 32 from directional tap 33, and to derive three groups of resultant signals at terminals 34—36. For example, the signal groups at those terminals may each have carrier frequencies in the 174—216 mc. band corresponding to local 7—13; in addition, the signal groups at terminal 34 may have carrier frequencies in the 76—88 mc. band for channels 5 and 6. As a result, nine channels of programs are delivered at terminal 34, and seven channels of programs are delivered at each of terminals 35 and 36.

More specifically, the processing means 31 may include band pass filter means such as filters 37—39 connected to filter the cable transmitted signals and to transmit them on multiple parallel paths 40—42 respectively associated with the resultant signal groups at 34—36. Thus, filter 37 may segregate and pass the 132—174 mc. band signals; filter 38 may segregate and pass the 174—216 mc. band signals; and filter 39 may segregate and pass the 216—258 mc. band signals. In this regard, note that the signals on path 41 are in correspondence with those characteristic of local channels 7—13, whereas the signals on certain paths (namely 40 and 42) are out of correspondence with those characteristic of any of the local channels 2—13.

In addition, the processing means 31 may include converter means connected to convert the frequencies of those certain signals on each of paths 40 and 42 to the resultant signals referred to at 34 and 36. Note in this regard that the converter means may include modulators or mixers 43 and 44 with inputs to receive the signals on paths 40 and 42 and also to receive a fixed oscillatory signal. The latter in FIG. 2 is shown as supplied by a local oscillator. In FIG. 4 the oscillatory signal is supplied at 45 for transmission on the cable and ultimate segregation by filter 46, from which the oscillatory signal is supplied to the mixers. An oscillatory signal having the frequency 42 mc. is of unusual advantage in that when supplied to mixer 43 the 132—174 mc. input is converted (by addition) to 174—216 mc. output at terminal 34; and when supplied to mixer 44 the 216—258 mc. input is converted (by subtraction) to 174—216 output at terminal 36.

The apparatus also incorporates selector means for selectively and individually connecting the resultant groups of signals with the input to a TV receiver, or with the inputs to multiple receivers. Four such receivers are indicated at $R_A$, $R_B$, $R_C$ and $R_D$ in FIG. 2, this number being merely illustrative. The resultant groups of programs at terminals 34—36, as described, are typically delivered to switches 50—53 associated with the inputs to the receivers, the switches in this particular environment being three-position switches capable of selectively and alternately connecting a receiver with the terminals 34—36. Signal splitters 54—56 are shown connected in series with the terminals and switches in order that multiple receivers may be connected with each of the terminals 34—36. Thus, receiver $R_A$ may receive any of the groups of resultant signals via terminals $A_1$, $A_2$ and $A_3$; receiver $R_B$ may receive any of the groups of resultant signals via terminals $B_1$, $B_2$ and $B_3$; and so on.

It is a feature of the invention that the processing means 31 may be located remotely from the receivers, as for example on a pole supporting the cable 30. It may be combined with the directional tap equipment 33, and the splitters 54—56 may also be at that location. Therefore, several receivers may be served by one processor or converter, with savings in cost of installation, while enabling viewing of many programs more than would be possible with conventional equipment.

On the other hand, the processor or converter equipment may be located proximate a receiver, as indicated in FIG. 3. As there shown, the converters 31_a_—31_d_ are respectively connected with the receivers $R_A$—$R_d$, as via the respective switches 60_a_—60_d_, which receive the multiple outputs from the converters and select the desired group of signals for transmission on the local channels of the receiver.

Accordingly, the invention eliminates need for a converter on top of the subscriber's television set cabinet. Also, the subscriber may use his remote control tuner in tuning his set. It should also be noted that the invention enables elimination of ghosts on the screens of the subscribers' sets; thus, if channels 2, 4, 5, 7, 9, 11 and 13 are being locally used for reception of broadcast (noncable) signals, channels 3, 6, 8, 10 and 12 are available for cable signals, and each of these channels can then be used for multiple programs, in accordance with the invention.

We claim:

1. In a system wherein a distribution cable is operable to transmit TV signals to TV receivers each having a limited number of local channels, the method of enabling selective reception on said channels of cable distributed programs the number of which exceeds the number of said local channels, said method including:

processing said signals to derive at least two groups of resultant signals characterized in that the resultant signals of each group have carrier frequencies corresponding to those characteristic of said local channels;

and selectively and individually connecting said resultant groups of signals with the input to a TV receiver; and said processing step including filtering the cable transmitted signals to transmit them on multiple parallel paths associated with said resultant signal groups, signals on each said path having frequencies different from signals on another said path, certain signals on at least one of said paths having carrier frequencies out of correspondence to those characteristic of said local channels, and converting the frequencies of said certain signals to the frequencies of said resultant signals of a group associated with said one path.

2. The method of claim 1 wherein said connecting step comprises switching the receiver input into signal receiving communication with different of said groups of signals.

3. The method of claim 1 wherein said processing step is effected remotely from said receiver, and said connecting step is effected proximate said receiver.

4. The method of claim 3 wherein said processing step is effected remotely from multiple receivers, and said connecting step comprises switching the input of any of said receivers into signal receiving communication with a selected group of said resultant signals.

5. The method of claim 4 wherein said switching is effected proximate said receiver.

6. The method of claim 1 wherein said converting step includes providing a fixed oscillatory signal, and heterodyning said fixed signal with said certain signals.

7. The method of claim 6 including the step of transmitting said fixed signal on said cable.

8. In a system wherein a distribution cable is operable to transmit TV signals to TV receivers each having a limited number of local channels, apparatus enabling selective reception on said channels of cable distributed programs the number of which exceeds the number of said local channels, comprising:

means for processing said signals to derive at least two groups of resultant signals characterized in that the resultant signals of each group have carrier frequencies corresponding to those characteristic of said local channels;

and selector means for selectively and individually connecting said resultant groups of signals with the input to a TV receiver, said processing means including band pass filter means connected to filter the cable transmitted signals and to transmit them on multiple parallel paths associated with said resultant signal groups, signals on each said path having frequencies different from signals on another said path, certain signals on at least one of said paths having carrier frequencies out of correspondence to those characteristic of the local channels, and converter means connected to convert the frequencies of said certain signals to said resultant signals of a group associated with said one path.

9. The system of claim 8 wherein said converter means includes a local oscillator and a modulator to mix the oscillator output and said certain signals.

10. The system of claim 8 wherein said converter means includes a modulator to mix a fixed oscillatory signal with said certain signals, and including means to transmit said oscillatory signal from said cable to said modulator.

11. The system of claim 8 wherein said selector means comprises a multiposition switch located proximate a receiver.

12. The system of claim 11 wherein said signal processing means is located remotely from said receiver.

13. The system of claim 8 wherein said signal processing means is located remotely from multiple receivers, said selector means comprising a switch located proximate one of the receivers, there being other selector means as defined in claim 8 and comprising switches located proximate others of said receivers.

14. The system of claim 8 wherein said processing means is located at the cable tap from which television signals are supplied to multiple receivers.

15. For use in a system wherein a distribution cable is operable to transmit TV signals to TV receivers each having a limited number of local channels, apparatus enabling selective reception on said channels of cable distributed programs the number of which exceeds the number of said local channels, comprising:

means for processing said signals to derive at least two groups of resultant signals characterized in that the resultant signals of each group have carrier frequencies corresponding to those characteristic of said local channels;

and selector means for selectively and individually connecting said resultant groups of signals with the input to a TV receiver, said processing means including band pass filter means connected to filter the cable transmitted signals and to transmit them on multiple parallel paths associated with said resultant signal groups, signals on each said path having frequencies differing from signals on another said path, certain signals on at least one of said paths having carrier frequencies out of correspondence to those characteristic of the local channels, and converter means connected to convert the frequencies of said certain signals to said resultant signals of a group associated with said one path.

16. Apparatus as defined in claim 15 wherein said converter means includes a modulator to mix a fixed oscillatory signal with said certain signals, and including means to transmit said oscillatory signal to said modulator.

17. For use in a system wherein a distribution cable is operable to transmit TV signals to TV receivers each having a limited number of local channels, apparatus enabling selective reception on said channels of cable distributed programs the number of which exceeds the number of said local channels, comprising:

means for processing said signals to derive at least two groups of resultant signals characterized in that the resultant signals of each group have carrier frequencies corresponding to those characteristic of said local channels;

and selector means for selectively and individually connecting said resultant groups of signals with the input to a TV receiver;

said processing means including band pass filter means connected to filter the cable transmitted signals and to transmit them on multiple parallel paths associated with said resultant signal groups, certain signals on at least one of said paths having carrier frequencies out of correspondence to those characteristic of the local channels, and converter means connected to convert the frequencies of said certain signals to said resultant signals of a group associated with said one path;

said converter means including a modulator to mix a fixed oscillatory signal with said certain signals, and including means to transmit said oscillatory signal to said modulator;

there being three groups of said resultant signals and characterized in that said band pass filter means supplies cable transmitted signals of the approximate frequencies 132—174 mc. on one of said paths; signals of the approximate frequencies 174—216 mc. on a second of said paths; and signals of the approximate frequencies 216—240 mc. on the third of said paths.

18. Apparatus as defined in claim 17 wherein said fixed oscillatory signal is of approximately 42 mc.